United States Patent [19]

Rouchon et al.

[11] 4,325,083

[45] Apr. 13, 1982

[54] HIGH DYNAMICS MULTISPECTRAL OPTO-ELECTRICAL RECEIVER SYSTEM

[75] Inventors: Jean M. Rouchon; Jean P. Lepeytre, both of Paris, France

[73] Assignee: Thomson-CSF, Paris, France

[21] Appl. No.: 144,972

[22] Filed: Apr. 30, 1980

[30] Foreign Application Priority Data

May 2, 1979 [FR] France ................... 79 11021

[51] Int. Cl.³ .......................... H04N 5/26; H04N 5/33
[52] U.S. Cl. ..................................... 358/228; 358/113
[58] Field of Search ................. 358/225, 228, 42, 113; 354/43, 44, 270, 271; 352/141

[56] References Cited

U.S. PATENT DOCUMENTS 2,416,919  3/1947  Goldsmith .......................... 358/225
2,898,536  8/1959  Musolf .............................. 358/228

*Primary Examiner*—John C. Martin
*Attorney, Agent, or Firm*—Cushman, Darby & Cushman

[57] ABSTRACT

System in which multispectral filtering and variable optical attenuation are effected on the same support. In the case of a supporting disc it has two angular graduated attenuators produced symmetrically with respect to a referenced diameter. Each attenuator also forms optical filters in a given spectral band so as to be able to operate in two separate bands. The disc is positioned in the vicinity of a relay objective positioned between the receiving objective and the opto-electrical transducer. The detected signal supplies a loop controlling the angular position of the disc. The disc is controlled in such a way that the switching of the band takes place on passing through the maximum density zones of the attenuators.

4 Claims, 7 Drawing Figures

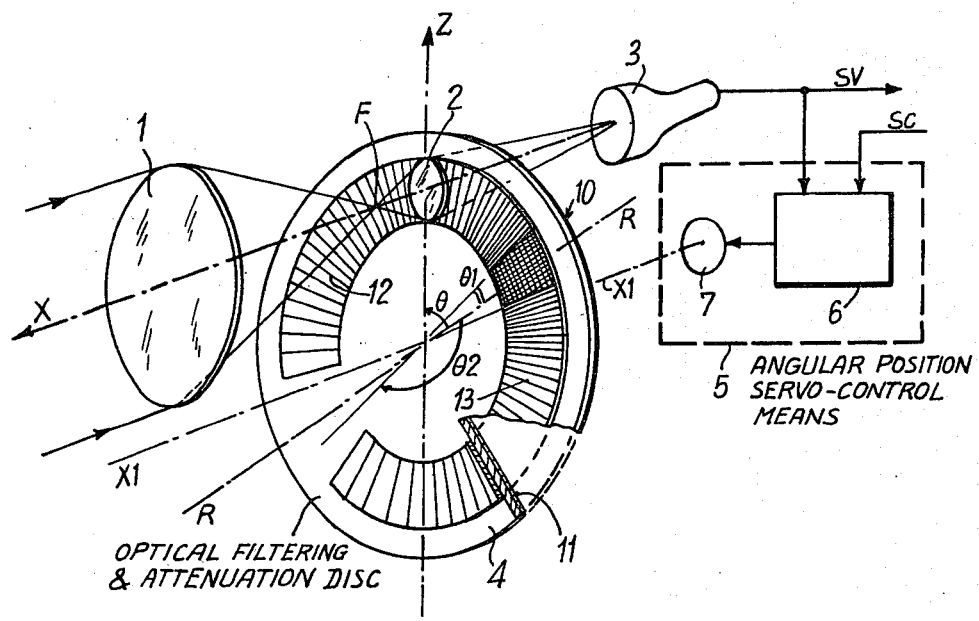
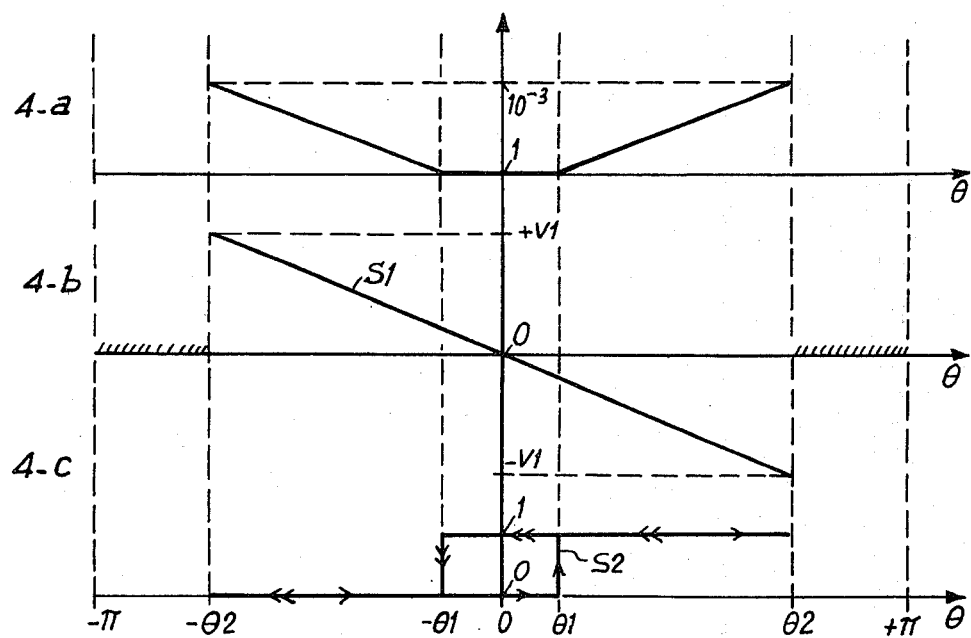

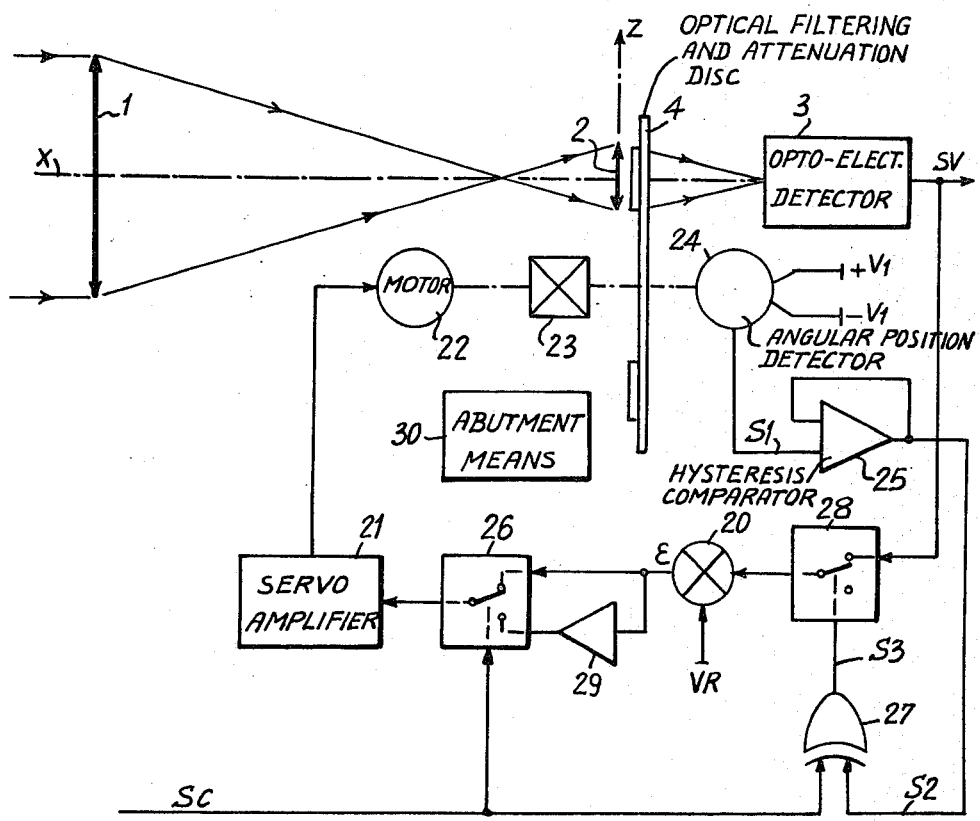
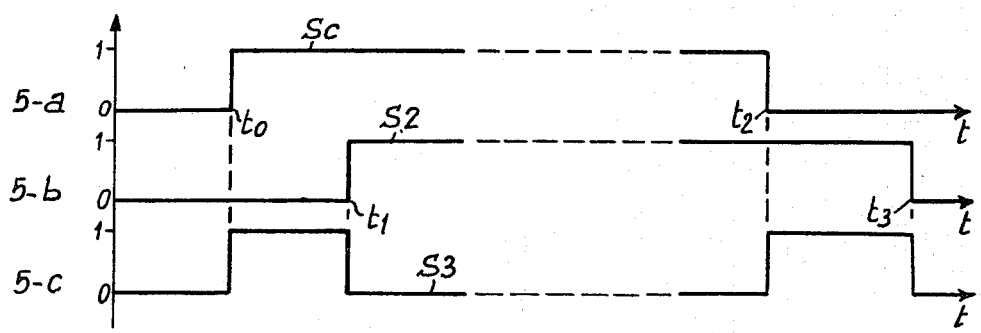

HIGH DYNAMICS MULTISPECTRAL OPTO-ELECTRICAL RECEIVER SYSTEM

BACKGROUND OF THE INVENTION

The present invention relates to a high dynamic multispectral opto-electrical receiver system.

Numerous receiver systems incorporate a limited dynamics opto-electrical transducer device. This is in particular the case with a television camera tube. It is therefore necessary to introduce into the optical part means which make it possible to increase the dynamics, so as to enable the system to operate in wider scene illumination range.

BRIEF SUMMARY OF THE INVENTION

It is an object of the present invention to provide an opto-electrical receiver system making it possible on the one hand to maintain the illumination level with the transducer either constant or varying in a limited range in accordance with the operating characteristics of the transducer, whereas the scene illuminations can vary within a very wide range, and on the other hand to select at random different predetermined spectral bands for the observation of the scene.

In optical systems the means ensuring the selection of spectral bands are generally dissociated from those which bring about the increase in the dynamics. Illumination level with the photoreception plane is inversely proportional to the square of the effective aperture T of the system $T = F/\sqrt{\tau}$ with F being the geometrical aperture and $\tau$ the transmission of the optics. Thus, for increasing the dynamics it is possible to act either on the geometrical aperture or on the transmission. If a large increase in the dynamics is desired, for example a ratio of 1:1000 instead of 1:10 in a television camera or pickup tube, the action on the geometrical aperture by introducing a regulatable diaphragm is of little interest, in view of deterioration to the quality of the image by diffraction phenomena. The preferred solution, which preserves the quality of the image consists of acting on the optical transmission $\tau$ of the system. A neutral wedge can be placed in the optical path and the displacement of the wedge makes it possible to vary the transmission coefficient $\tau$. It is also possible to use an equivalent means consisting of a graduated attenuator which is defined by a transparent support covered with thin layers producing a continuous density variation. This variation can be linear, angular or radial and corresponds to a predetermined law.

The sector band can be changed by mechanical switching of the optical filters placed in the optical path. An optical filter is obtained by a sheet of a given material or by depositing thin coatings on a transparent support.

It is known to construct an in particular, angular, graduated attenuator, i.e. whose density variation is effected in an angular manner, the thin layers forming the variable density being deposited along a circular ring on a supporting disc made from glass or some other transparent material. The optical attenuation is made variable by rotating the disc, the variable density ring intercepting the radiation on the optical path. By the choice of the support material or by depositing thin layers it is also possible to produce optical filtering in a considered operating band.

It is a feature of the invention to combine these procedures for performing in an advantageous manner on the same support the multispectral filtering function and the variable optical attenuation function.

Another object of the invention is to protect the photoelectrical receiver during a change in the spectral band.

According to a feature of the present invention a high dynamics multispectral opto-electrical receiver system is produced which incorporates optical means for receiving and focusing the light radiation to form the image of the field observed on an opto-electrical transducer, the optical means having attenuation and spectral band selection means in the form of a graduated optical attenuator controlled in position by a supplementary device and in which the attenuator, which also forms an optical filter, is repeated several times and is determined in such a way that it constitutes on each occasion an optical filter in a different spectral band and has the same attenuation law, as a function of the position.

BRIEF DESCRIPTION OF THE DRAWINGS

The invention is described in greater detail hereinafter relative to non-limitative embodiments and the attached drawings, wherein show:

FIG. 1 a general diagram of a opto-electrical receiver system according to the invention.

FIGS. 2a, 2b, and 2c an embodiment of the attenuator and the filter used according to the invention.

FIG. 3 a diagram of the body of a system according to FIG. 1.

FIG. 4 response curves of components and circuits forming part of the system according to FIG. 3.

FIG. 5 characteristic signal wave forms relative to the operation of the system according to FIG. 3.

DETAILED DESCRIPTION OF THE PREFERRED EMBODIMENTS

Figure 2A:
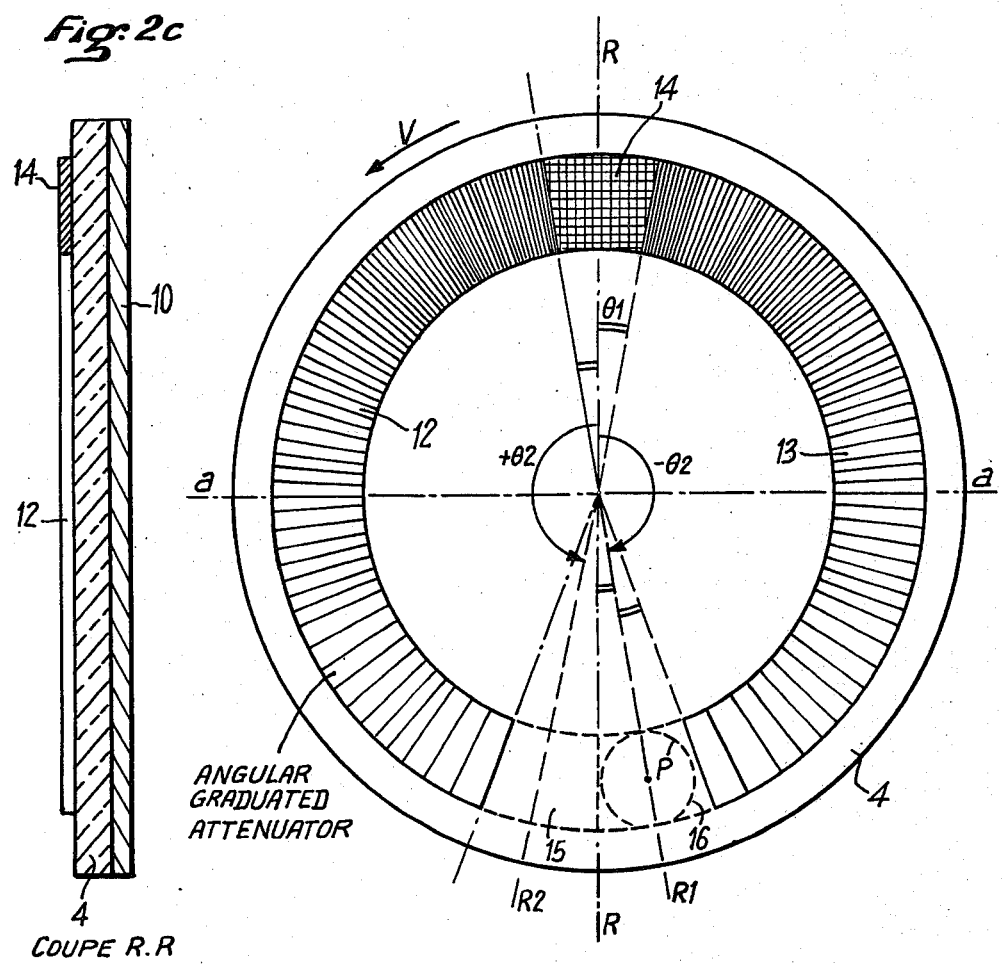

According to the simplified diagram of FIG. 1 the system incorporates optical means designated by the two lenses 1, 2 an opto-electrical transducer 3, such as for example a vidicon tube of a television camera and optical filtering and attenuation means on one and the same support, for example on a rotary disc 4, the attenuator being in this case an angular graduated attenuator.

A supplementary device 5 controls the angular position of disc 4 to obtain the desired attenuation. As the object to be achieved is generally to maintain the illumination so that it varies within a limited range level with the photosensitive plane of the opto-electrical receiver 3, the video signal SV is consequently supplied to the device 5 to form the feedback circuit 6 supplying a drive servomotor 7.

In order to obtain multispectral operation, according to which the useful radiation reaching receiver 3 can be selected from a plurality of predetermined spectral bands, according to the invention disc 4 is designed in a special way. The arrangement is made so as to provide the different filters on the same support by associating with each of them the attenuating function, which is variable by the angular positioning. The operating band change control is symbolized by a control signal SC transmitted to device 6.

Figure 2B:
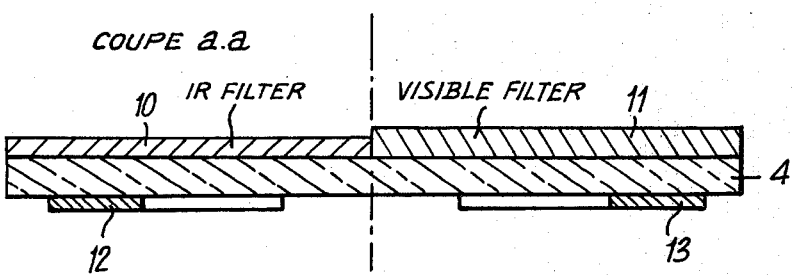

An exemplified embodiment of the attenuator-filter is described hereinafter with reference to FIGS. 2a, 2b and 2c.

According to this embodiment there are two filters, for example a first filter corresponding to a central band in the visible and a second filter corresponding to a central band in the very-near infra-red.

Diameter RR taken as the reference axis, divides the disc into two equal sectors with an angle at the centre of 180°. A deposit 10 is made on a first sector to form a first filter and a deposit 11 on the second sector forms the second filter, as is shown by the median cross-section of the FIG. 2b.

An angular graduated attenuator 12, 13 is associated with each of the filters and is in the form of thin absorbent layers deposited on the second face of the glass support 4. The transmission of the layers varies as a function of the optical density of the deposit. The deposits have a very limited thickness, the dimensions being exaggerated in the drawing for reasons of clarity. The deposit can be made in such a way that the optical density defined by $D = -\log \tau$ varies in a linear manner as a function of the angular position $\theta$ i.e. $D = k\theta$.

The deposits 12 and 13 are made symmetrically with respect to the reference diameter in such a way that they do not overexpose the target of the opto-electrical receiver 3 during a change in the operating band. This arrangement makes it possible to switch the filters 10, 11 by passing through the high density zone of the two graduated attenuators, provided that there is a rotation in the appropriate direction according to V to pass from filter 10 to filter 11 and in the opposite direction to pass from filter 11 to filter 10.

The deposits forming the filters and the graduated attenuators can be made on the same face of the supporting disc. Moreover, the filters can be limited in accordance with a configuration corresponding to that of the attenuator, i.e. a circular ring in the present embodiment.

In the embodiment shown the deposits are separated and the filters 10 and 11 have differing thicknesses in the optical axis to correct the chromatic aberration which would result from a focusing defect on the target of tube 3 during the passage from one filter to the other.

Circle P represents the pupil of the optical system level with the plane of the disc. The diameter of the pupil substantially corresponds to the radial dimension of the attenuating ring. In order to produce the disc with small dimensions the optical system is divided into two parts, as shown in FIG. 1, having an input objective 1 which focuses the input radiation from the field observed in the focal plane passing through the main focus F and a second objective 2 which transfers the image of the field level with the reception plane, in this case the target of the vidicon tube 3 of a camera. The disc is positioned in the vicinity of the second objective, called the relay objective and can therefore be positioned level with a pupil with a smaller diameter than that of the objective 1. The positioning of the attenuator in the plane of an optical pupil makes it possible to attenuate in the same way the radiation from any point in the observed field. Another advantage of this arrangement is the possibility of working in a wide or narrow beam or field by simply switching over the relay objective 2.

FIG. 4a is an example of the transmission variation law of attenuator 12 or 13, as a function of the rotation angle $\theta$. The value $\theta = 0$ corresponds to coincidence between the diameter RR and the cartesian reference axis Z. The terminal high density area 14 of the attenuators substantially produces the sealing or closing of the beam, the angle at the corresponding centre $2\theta 1$ is then determined as the function of the diameter of pupil P. Conversly the terminal areas 15 and 16 at the other end of the attenuator produce a minimum attenuation corresponding to the residual attenuation due to the passage through support 4 and filtering layers 10, 11.

Areas 15 and 16 are also dimensioned as a function of pupil P. The angle $\theta 2$ (or $-\theta 2$) corresponds to the total angular travel to be performed in operation by each attenuator. In this embodiment $\theta 2 = \pi - \theta 1$. Abutment means are provided to limit the travel at these values, i.e. when radius R1 (or R2) positions itself in accordance with the reference direction Z, perpendicular to the optical axis X (FIG. 1). The disc is rotated around an axis X1 parallel to X.

FIG. 3 shows in greater detail the embodiment of the control device 5 with which, in conventional manner, has a circuit 20 where the signal SV to be regulated is compared with a reference value VR, an amplifier 21 for the error $\epsilon$ collected at the output from the differential comparator 20 and a servomotor 22 supplied by the amplifier. The motor drives the disc via a reduction gear 23. It is obvious that the signal SV to be compared consists of the mean value of the video signal obtained by means of a not shown integrating circuit. The video circuit or its mean value is then regulated by the loop which controls the position of the graduated attenuator as a function of the scene illumination variation.

The other circuits shown deal with the switching of the band, provided that the disc rotates in the direction permitting the passage through the maximum density area (14, FIG. 2a) so as not to blind the vidicon tube during a spectral band change. An angular position detector constituted by a potentiometer 24 supplies by its wiper a signal S1, shown in FIG. 4b, which varies between voltages plus V1 and minus V1 applied to the potentiometer terminals. A hysteresis comparator circuit 25 transforms the signal S1 into a signal S2 with two states, shown in FIG. 4c. The changes of state substantially take place for values $\theta 1$ and $-\theta 1$ of exceeding the maximum density area 14 as a function of the considered spectrum change. The binary control signal SC (FIG. 5a) is directly transmitted to a first gate 26 and across an exclusive OR circuit 27 to a second gate 28. Signal S2 is supplied to the second input of the OR circuit 27. Values 0 and 1 of control signal SC correspond respectively to the selection of visible band (filter 11, FIG. 2b) and infro-red band (filter 10, FIG. 2b). The wave forms of FIG. 4 represent to the left the case of IR-visible switching and to the right the case of visible-IR switching. At time $t_0$ of the application of the band change signal SC, whilst operating in the infrared, the gate 26 and 28 are switched over, which has the effect of disconnecting input SV from comparator 20 which supply signal VR. As the attenuators 12 and 13 are symmetrical to diameter RR, the rotation direction of the disc must be reversed, which is obtained by the unity gain inverting circuit 29. After passing beyond area 14 signal S2 changes value (FIG. 5b), as does output S3 of the OR circuit 27 at time $t_1$. As a result the gate 28 returns to the initial state and control takes place with the desired rotation direction. Conversely for a visible-IR switching at time $t_2$ gate 26 returns to the state indicated in the drawing and gate 28 is operated as indicated hereinbefore. The signal VR recovered at the output from comparator 20 is directly applied to amplifier 21. After the change of state of signal S2 gate 28 returns to the initial state shown.

Block 30 in FIG. 3 symbolizes the supplementary means forming the end of travel abutment for limited the maximum rotation amplitude of the disc at angular value $\theta 2$ defined hereinbefore and to prevent the passage into the other filtering sector. These means can easily be obtained in various ways, on the basis of various known technologies. Thus, for example, on abutting this can be effected in such a way that action occurs on the supply gain 21 of the drive motor. The opposite action is initiated to move out of the abutment position when the video signal again varies in the increasing direction.

It is obvious that the system described hereinbefore can be modified in various ways within the scope of the invention. In particular the graduated attenuator can be linear and can be repeated more than twice with associated filters for working in the same number of separate spectral bands. According to the latter configuration the filter switching operations cannot be produced by passing on each occasion through maximum density zones and the graduated attenuators can be successively repeated in the same way in accordance with the displacement direction. In addition a supplementary closing or sealing device can be added and controlled so as to protect the tube during the switching of the filter.

What is claimed is:

1. A high dynamics multispectral opto-electrical receiver system incorporating optical means for the reception and focusing of light radiation to form the image of the field observed on an opto-electrical transducer for video signal detection, said optical means being provided with attenuation and optical filtering means for the selection of two different spectral bands of operation and for providing a variable light transmission, said attenuation and optical filtering means comprising a transparent disc support, layers deposited on the said support along two sectors of a circular ring to provide filtering in the said two bands respectively and attenuation variation as a function of the angular position of the disc, said layers comprising two graded angular attenuators symetrically produced with respect to a reference diameter, said sectors being joined at one end by a high density area to seal the light transmission, and separated at the other end by a minimum density area to produce substantially no attenuation, and a servo-control device to rotate said disc and to control its angular position as a function of the video signal value.

2. A system according to claim 1, wherein the optical reception and focusing means comprise a focusing objective followed by a relay objective which transfers the image focused on the photodetection plane of the transducer in such a way as to produce the said circular ring with small dimensions, said disc being positioned level with the relay objective.

3. A high dynamics multispectral opto-electrical receiver system incorporating optical means for the reception and focusing of light radiation to form the image of the field observed on an opto-electrical transducer for video signal detection, said optical means being provided with attenuation and optical filtering means for the selection of two different spectral bands of operation and for providing a variable light transmission, said attenuation and optical filtering means comprising a transparent disc support, layers deposited on the said support along two sectors of a circular ring to provide filtering in the said two bands respectively and attenuation variation as a function of the angular position of the disc, said layers comprising two graded angular attenuators symetrically produced with respect to a reference diameter, said sectors being joined at one end by a high density area to seal the light transmission, and separated at the other end by a minimum density area to produce substantially no attenuation, and a servo-control device to rotate said disc and to control its angular position as a function of the video signal value, said servo-control device incorporating means for controlling the rotation of the disc in an opposite direction during a switching of the operating band in such a way as to change filter on passing through maximum density attenuation zones of the graded attenuators and through the said high density area.

4. A system according to claim 3, wherein the means for controlling the rotation includes an angular position detector constituted by a potentiometer driven by the disc and whose wiper signal supplies a hysteresis comparator circuit, the controlling means including mechanical abutment means to limit the travel of the disc in the said minimum density area and to prevent the passage into the other filtering sector.

* * * * *